United States Patent [19]
Leonhardt

[11] Patent Number: 5,487,670
[45] Date of Patent: * Jan. 30, 1996

[54] DYNAMIC LANGUAGE TRAINING SYSTEM

[76] Inventor: Helga F. Leonhardt, 640 San Elijo St., San Diego, Calif. 92106

[*] Notice: The portion of the term of this patent subsequent to Mar. 1, 2011, has been disclaimed.

[21] Appl. No.: 742,403

[22] Filed: Aug. 8, 1991

Related U.S. Application Data

[63] Continuation-in-part of Ser. No. 424,716, Oct. 20, 1989, abandoned.

[51] Int. Cl.$^6$ ........................................ G09B 1/00
[52] U.S. Cl. ..................... 434/167; 434/170; 434/171; 434/172; 434/173
[58] Field of Search ........................... 434/170–173, 434/156, 167, 169, 307; 273/434, 437, 430, 431

[56] References Cited

U.S. PATENT DOCUMENTS

| | | |
|---|---|---|
| 1,439,551 | 12/1922 | Hyland . |
| 2,520,649 | 8/1950 | Northrop . |
| 3,235,976 | 2/1966 | Elliott et al. . |
| 3,389,480 | 6/1968 | Holland . |
| 3,871,115 | 3/1975 | Glass et al. . |
| 4,044,476 | 8/1977 | Marsh . |
| 4,478,582 | 10/1984 | Tucker . |
| 4,613,309 | 9/1986 | McCloskey . |
| 4,820,165 | 4/1989 | Kanapa ............................. 434/156 X |

FOREIGN PATENT DOCUMENTS

| | | |
|---|---|---|
| 939870 | 1/1947 | France . |
| 1157255 | 8/1956 | France . |
| 2318302 | 4/1973 | Germany . |
| 220512 | 7/1942 | Switzerland . |

OTHER PUBLICATIONS

H. Hendriks, "Instant Language Chart—Learn German Through Composition", 1977.
H. Hendriks, "Instant Language Chart—Learn Spanish Through Composition", 1980.
H. Hendriks, "Leonhardt Language System, Spanish", 1980.
R. Ellison, "Visualization at Work", Eastman Kodak Company, Mar. 1990, pp. 26, 55–56.

Primary Examiner—Jennifer Bahr
Attorney, Agent, or Firm—Knobbe, Martens, Olson & Bear

[57] ABSTRACT

An educational dynamic method of teaching language is disclosed wherein a set of geometrically-shaped objects represent the parts of speech of natural human languages. The objects are animated to undergo shape change, act alone, and interact with other of the objects to represent symbolically the actions performed on or by each part of speech. Frameworks defined by the grammatical case patterns of the represented language provide the boundaries for arrangement of the objects. Each object is configured to logically represent the complements of the class of words pertaining to the part of speech represented by the object. Animation of the objects in the form of shape changes and dynamic interaction within and between the objects assists in representing the words, expression and action, whether it be voluntary, involuntary, active or inactive. Each object contains the vocabulary words consistent with the level of the language being taught which fall into the class or part of speech represented by that object. The method may be taught in lecture or viewable form, or used interactively with the user selecting sentences conforming to a plurality of predefined patterns.

18 Claims, 6 Drawing Sheets

Rover eats chocolate and cookies.

Conjunction

The little dog is my friend.

Rover barks loudly.

DYNAMIC LANGUAGE TRAINING SYSTEM

This application is a continuation-in-part application of U.S. patent application Ser. No. 07/424,716 filed Oct. 20, 1989 now abandoned.

NOTICE OF COPYRIGHTED SUBJECT MATTER

A portion of the disclosure of this patent document contains material that is subject to copyright protection. The copyright owner has no objection to the facsimile reproduction by anyone of the patent document or the patent disclosure, as it appears fin the U.S. Patent and Trademark Office patent file or records, but otherwise reserves all copyright rights whatsoever.

BACKGROUND OF THE INVENTION

1. Field of the Invention

This invention relates to improvements in language training methods, wherein the improved method can be used to teach language and language understanding. The system of the present invention is based on grammatical rules and utilizes dynamic interaction between colored objects which represent symbolically each part of speech of natural human languages. This invention further relates to teaching processes between interrelated components.

2. Description of the Prior Art

Educational environments are constantly in search of effective and efficient ways to teach language. Most students reluctantly struggle through the required courses to learn their own language. Learning another language is usually seen as unconquerable. Therefore, a new method for understanding and acquiring proficiency in any language is desirable. Especially desirable would be a language training system which could represent graphically every word and every sentence in every language by utilizing animated graphical objects in which the action and interaction appropriately represents the grammatical function of each part of speech of "natural" language. It is also desirable that the method be amenable to all ages and educational levels, technical and conversational speech, work, school, home, initial basics of native language, a new language, and more advanced communication skills.

References such as U.S. Pat. No. 4,478,582 by Ruth L. Tucker, and U.S. Pat. No. 4,613,309 by Emily A. McCloskey, describe systems which utilize fixed, colored shapes which interrelate with one another so that the user may fit the partially related or interlocking pieces together to form proper sentences. McCloskey, for instance, discloses puzzle like shapes with symbols printed. The combination of puzzle pieces with symbols suggests proper arrangement of the parts of speech in order to form proper sentences. McCloskey claims to improve upon previous systems by allowing construction of generally unlimited sentence patterns and unlimited vocabulary. The previous puzzle and frame methods were inherently limited in this aspect.

References such as McCloskey are directed to overcoming the problem of students' inability to understand how each part of speech in a language relates to the other parts of speech by providing numerous speech elements and dividing them into color coded sets. However, simply aligning the proper parts of speech in an expression will not necessarily help the student conceptualize exactly how each part of speech acts or is acted upon. The student may see and understand the layout, but may not understand the layout's significance. For instance, placing a verb after a noun in the McCloskey model suggests nothing about how the verb acts upon the noun or how the noun is acting.

Thus, there is a deficiency in the prior art with respect to visual methods and apparatus of language instruction.

SUMMARY OF THE INVENTION

The present invention provides an educational tool that uses a majority of the senses (e.g., sight, sound, touch, etc.), presents grammatical rules in dynamic graphic form, teaches concepts not memorization, promotes faster learning, and is versatile and-adaptable so it may be used for any language and any age group. The present invention provides a method of teaching complete understanding and comprehension of any language, including dead languages (such as Latin) or language history (such as the evolution from old English to modern English).

The present invention involves a language training method which utilizes colored, geometrically-shaped structures, images or objects (hereinafter collectively "objects") which interact dynamically to suggest the natural interrelationships and behaviors between the parts of human language. The dynamic interaction involves animated motion by the various colored objects, wherein some objects actually change form and shape, depending on the grammatical context of the sentence, and wherein some objects simply move in relation to the other objects to suggest the structure and the substantive content of the sentence. For instance, an object representing an adjective can orbit an object representing a noun to illustrate the adjective's modification of the noun. In addition, to signify access to a word contained within a noun object, a drawer-like portion containing the particularly chosen word would extend from the noun object, thereby releasing the word from within the structure. This motion, which may or may not be accompanied by instructive sounds, indicates that the word which is released from the drawer is a noun and that it falls within a selected category of nouns which is associated with that particular drawer-like portion.

The system is dynamic internally in that many animated movements and shape changes are predetermined consistent with the rules of construction of the chosen language. Moreover, in an interactive implementation, the system is dynamic via a user who may control the animation of the objects within the boundaries defined consistent with the language's rules of construction.

The use of the animated dynamic interaction within and between the colored objects suggests to the student how proper sentences are formed, how the parts of speech or parts of the human language logically act or are acted upon, and how the parts of speech interact and interrelate with each other in natural human languages. The animated dynamic interaction within and between the objects represents a new concept which is significantly helpful in teaching a complete understanding of any language at any learning level.

This dynamic language training method provides an interesting teaching method to teach grammar rules, syntax, sentence construction, vocabulary, semantics, pronunciation, reading, speaking and writing of the chosen language.

The dynamic language training system disclosed comprises the steps of providing a plurality of geometrically-shaped objects, each object representing a part of speech in a natural human language, wherein each object contains the words applicable to the level of the language being taught;

defining logical colors corresponding to the objects, each color representing a specific subcategory of the part of speech represented by the object; arranging the objects in accordance with a predetermined grammatical pattern of a natural human language to form a sentence or a clause; defining animated dynamic interaction within and between the objects that represents symbolically the actions performed on or by each part of speech, wherein the dynamic interaction includes animated movement of, and changes in form by, the objects to represent logically the natural interaction between the parts of speech, and to suggest the proper structure of the sentence, expression or word; and defining the configuration of each object to logically represent the compliments to the given parts of speech.

The general categories of parts of speech represented by the objects consist of nouns, verbs, adverbs, adjectives, pronouns, prepositions, interjections and conjunctions; each category is represented by a unique, colored, geometrically-shaped object, and each subcategory of each category is represented and differentiated by a shade of color assigned to the category. For instance, if an object is colored dark green, a subcategory of the part of speech represented by that object may, be light green. Furthermore, a noun object that functions as a subject would be one-color, and a noun object that represents a direct object would be a different color.

In the present invention, the geometrically-shaped objects are animated so that the objects change in form and move in relation to each other in a manner which suggests the grammatical interaction of the represented-parts of speech, be it voluntary, involuntary, active or inactive. The animation can be accomplished in a variety of ways well known in the art. For instance, the geometrically-shaped objects can be computer generated images on a computer screen. The images can then be animated, under computer control. In one embodiment, the animated images could be recorded on video tape for viewing by the student. In another embodiment, the structure could be animated in the traditional sense through a series of still drawings combined in a film or video to generate animated motion, as is well known in the art. Other animation techniques are also well known.

The animation of the objects of the present invention helps students overcome their inability to understand how each part of speech in a given language relates to the other parts of speech. Each student will also easily understand and conceptualize the relationships between the parts of speech and their subcategories.

In the present invention, each part of speech is represented by a unique, geometrically-shaped object. For instance, an object representing a noun includes a base which represents pronouns which may replace the noun or project to cover the noun structure when the noun object is animated. With animation, the base, representing the pronoun, will move upwardly to cover the entire noun object, suggesting the natural noun replacement function of the pronoun. The noun objects also have a head piece which represents limiting adjectives and articles to identify gender in some languages. The noun objects may also contain a side section or protruding extension section which represents prepositions which relate to the nouns which are represented by a selected noun object.

The shape of any given noun object may also change somewhat to represent the type of noun and the noun's action or the action taking place upon the noun. For instance, the graphical object representing a grammatical subject noun/pronoun will change if the subject is willfully active (e.g., "eat"), if the subject noun/pronoun is simply restful (e.g., "stand"), if the subject noun/pronoun is processing or involuntarily performing action (e.g., "fall"), or if the subject noun/pronoun is in a state of being (e.g., "be"). Similarly, the way the graphical objects representing verbs are animated to interact with or upon graphical objects representing nouns and other graphical objects representing additional parts of speech suggests the type of verb properly used in the sentence. The graphical objects representing other parts of speech also have logical configurations tied to the class of words represented and are animated to suggest the grammatical function or the performing role of the part of speech represented by the object in any sentence, and its interrelationships with other parts of speech.

The animated dynamic interaction uniquely contributes to the understanding and conceptualization of the function of each part of speech or proper sentence structure, and total language understanding. Moreover, since each structure may contain within it the words appropriate for the language, level, and application being taught, the possible construction of sentence patterns is limitless. Furthermore, the use of this method is amenable to non-interactive viewing or teaching, as well as completely interactive user involvement.

Thus, this invention provides a new and improved method and apparatus for teaching any natural human language. It can be used easily and efficiently to properly teach the principles of full language understanding. Being an object-oriented representation of language, the present invention is also useful in the field of translation from one language to another. The spatial organization of the graphical objects and their inherent vocabularies in the color-coded object framework makes it easier to transpose words from one language to another, in order to reduce translation errors. For example, the word "open" has many functions in the English language (e.g., "open" as a noun, "to open" as a verb, or "is open" as an adjective) which could present problems for translation into foreign languages. However, with the present invention, the term "open" is illustrated as an object representing a noun (e.g., in the function of the subject as well as direct and indirect objects), an object representing a verb and an object representing an adjective, each placed under the appropriate color, by animation, and location on the framework. For instance, in the case of animation, "open" as a noun object may twist, as a verb object may bounce, and as a descriptive adjective may orbit around another object.

In its broadest form, the present invention can even become a language unto itself, in the sense that the various objects and their relative motion convey universal meaning and information, apart from any particular language.

DESCRIPTION OF THE PREFERRED EMBODIMENT

Figure 1:
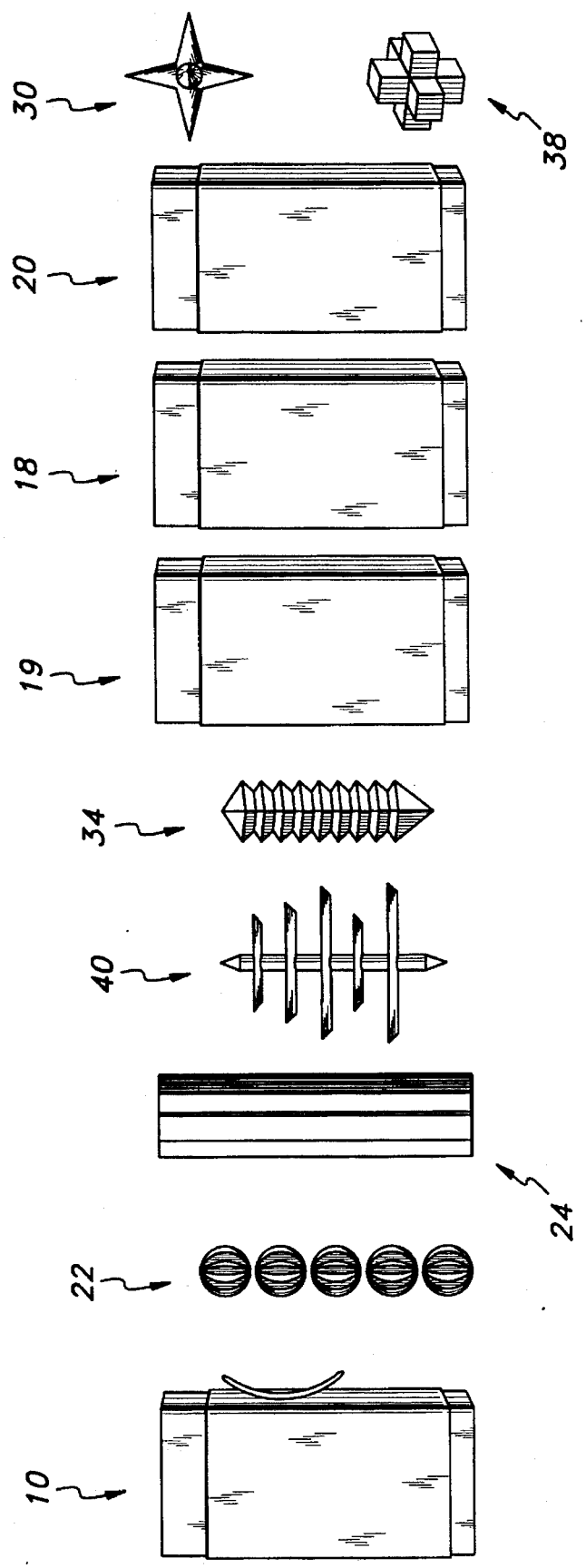
FIG. 1 is a representative view of the preferred geometrically-shaped objects representing the general categories of parts of speech according to the present invention.

For simplicity, only some of the basic embodiments and use of the present invention will be described. It should be understood that the present invention can be utilized with any language and that only a few representative samples are necessary to illustrate the principles of the invention. In addition, the objects shown in the drawings are, of course, static. In use, these examples would include animated dynamic action and interaction in representing expressions.

FIG. 1 portrays a suggested set of geometrically-shaped objects of the present invention uniquely representing each of the major parts of speech categories of the English language. Other geometrical objects are possible. The rectangular objects 10, 18 represent nouns; the spherical objects 22 represent verbs; the column shaped object 24 also represents verbs; the star shaped object 30 represents interjections; the satellite shaped object 34 represents descriptive adjectives; the three-dimensional "plus-sign" shaped object 38 represents conjunctions; and the object 40 represents adverbs.

These general categories of geometrically-shaped objects uniquely represent each of the parts of speech; assigning separate colors within these categories represents the related subcategories within these parts of speech. For instance, some exemplary English subcategories of nouns would be nominative nouns (commonly referred to as subjects), dative nouns (commonly referred to as indirect objects), accusative nouns (commonly referred to as direct objects) and genitive nouns (commonly referred to as possessive nouns). Ablative nouns and vocative nouns could also be represented, but these forms are no longer used in the modern English language. Other languages may have more or fewer subcategories. Each of these subcategories is assigned a distinct representative color.

Each object, in essence, contains the words which fall into the category represented by that object and are relevant to the level of the language and the specific field in the language being taught. For instance, the object representing nouns may have a plurality of drawer-like portions, each assigned to a selected category of nouns, and containing the words which fall into the selected category. More particularly, each drawer may contain one word group relating to People, Intangibles, Things, Food, Clothing, Places, Transportation, Plants and Trees, and the like.

Figure 2:
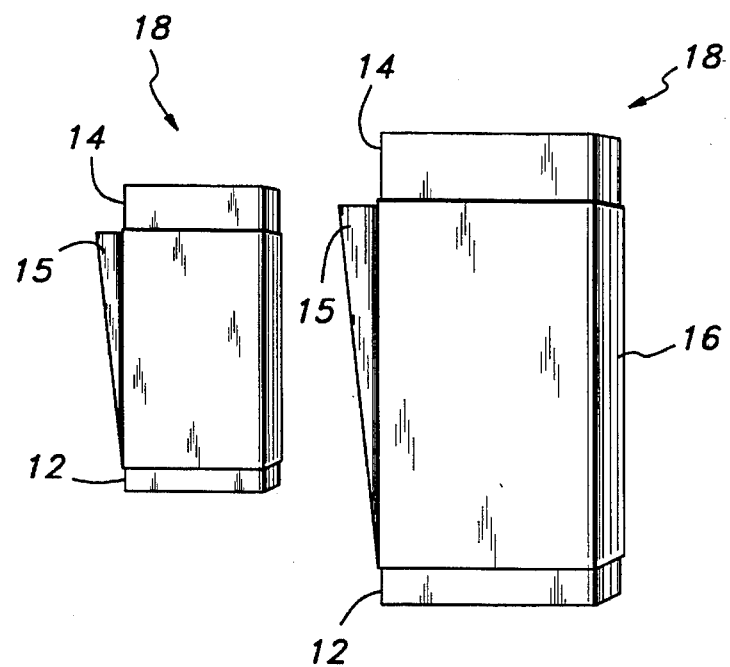
FIG. 2 depicts an embodiment of the configuration of the objects representing nouns, with a headpiece representing limiting adjectives and articles, a base representing pronouns, and a wing-like extension representing prepositions.

FIG. 2 depicts an embodiment of the structure of the noun object 18, with a base 12 representing pronouns which may replace the noun, a head piece 14 representing limiting adjectives which identify the noun (e.g., by uniqueness, belonging or number) or which can represent gender in many languages, and with a wing-like extension 15 representing prepositions. With animation, if a pronoun is used in place of a noun, the base 12 will move to cover or encompass the noun object 18. This represents the logical replacement role of the pronoun. If a preposition is used in connection with a noun, the wing-like structure 15 which can extend from the side of the noun object 18 to represents the preposition's relationship with the noun represented. The arrangement in FIG. 2 could represent a phrase such as "in this book." The wing-like extension 15 represents "in." The headpiece 14 represents the limiting adjective "this." The center 16 of the noun shape 18 represents the word "book."

Figure 3:
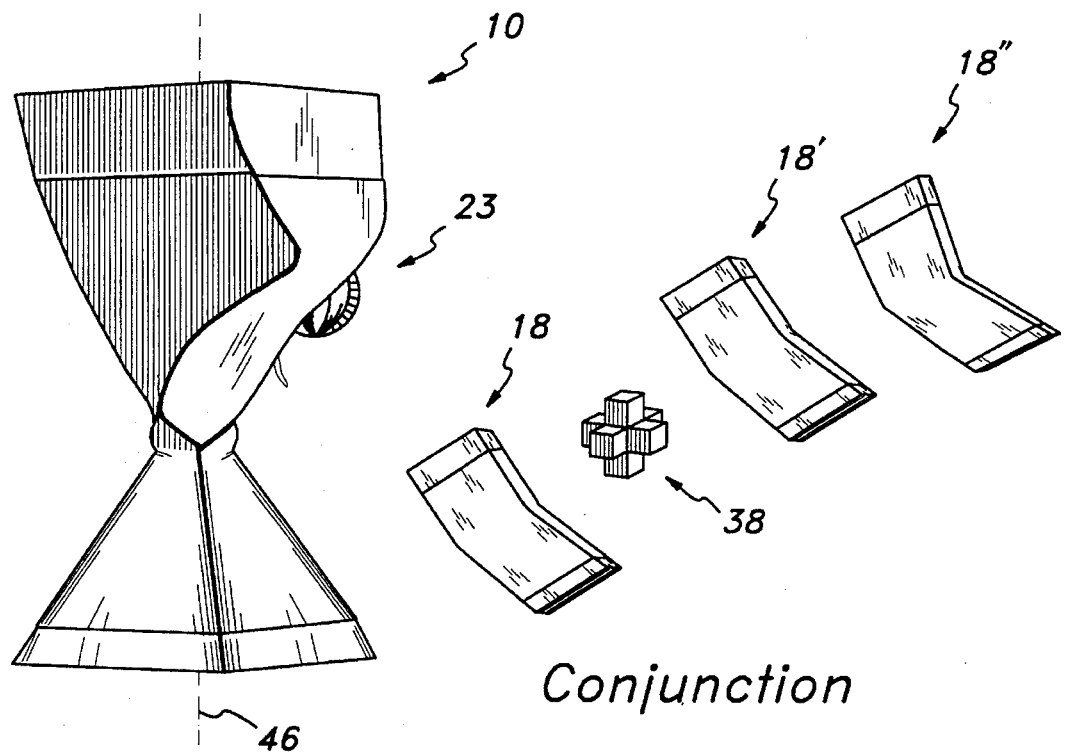
FIG. 3 portrays a static example of the use of the invention to represent a simple sentence consisting of a grammatical subject, verb, singular direct object, conjunction, and two direct objects (objects plural).

FIG. 3 depicts a simple sentence representation. The four rectangularly-shaped objects 10, 18, 18', 18" are noun objects; the rectangularly-shaped object 10 represents the noun for a grammatical subject and is assigned one color; the three other rectangularly-shaped objects 18, 18', 18" represent grammatical objects and are assigned a different color. The object in the form of a sphere 23 represents a verb which corresponds in color (to indicate relationship) to the direct objects 18, 18', 18" because the objects 18, 18', 18" which represent direct objects, are acted upon. The plus-sign 38, represents a conjunction which joins together a singular direct object 18 and two direct objects (plural) 18', 18".

In a preferred embodiment, this arrangement could represent the sentence "Rover eats chocolate (18) and cookies (18', 18")." The first noun object 10 represents the subject, "Rover." The sphere shaped verb object 23 represents "eats", and the three other noun structures 18, 18', 18" represent the direct objects "chocolate" and "cookies." The three-dimensional plus 38 represents the conjunction "and."

Figure 4:
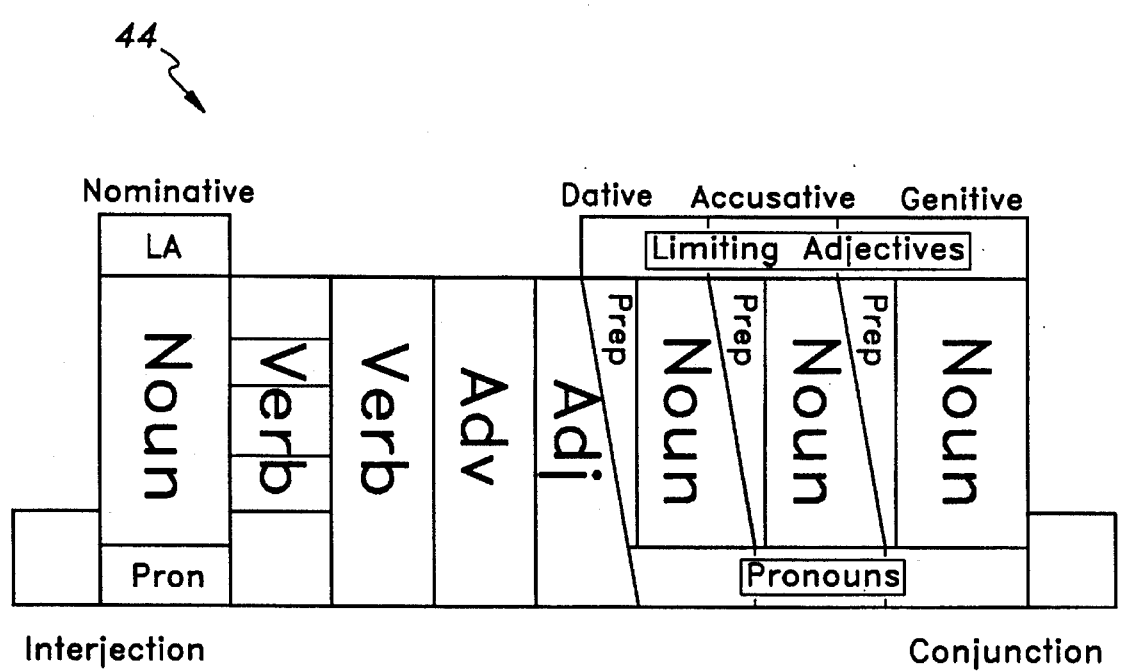
FIG. 4 depicts a possible boundary for arrangement of the objects of the present invention conforming to a macrostructure representing the grammatical case pattern of the English language.

FIG. 4 depicts a framework 44 and the boundaries of arrangement for the objects according to a predetermined pattern based on grammatical case structure of the modern English language. Other frameworks depicting the English language of an earlier time period (e.g., Old English), or foreign language, may be provided which follow additional structural patterns. The basic pattern depicted in FIG. 4 is defined by the basic grammatical pattern of the nominative case for subject noun and subject pronoun, verb, adverb, and adjective structures; the dative case for the indirect object noun and pronoun; the accusative case for direct object noun and pronoun; and the genitive case for possessive noun and pronoun. In order to form a sentence, the structures are arranged in accordance with a grammatically predetermined structural pattern appropriate for the selected language.

To form the statement represented in FIG. 3, the original layout of the noun object 10, the verb object 23 the noun objects 18, 18' and 18", and the conjunction object 38, are arranged according to the framework 44 shown in FIG. 4. In other words, the objects are arranged in accordance with the predetermined grammatical pattern represented by the framework 44. Accordingly, the verb object 23 follows the noun object 10 and precedes the noun objects 18, 19, 20 which are accusative (direct), dative (indirect) and genitive (possessive) objects in the sentence, respectively.

Once the objects are arranged according to the predetermined grammatical sentence pattern, the dynamic interaction begins In the animated system, the verb "eats," as represented by the sphere 23, first bounces toward and then attaches itself to the right side of the noun object 10, which after the union with the verb represents the subject "Rover." Because the sphere 23 represents a verb which induces willful voluntary action by the subject, this noun object 10, representing "Rover," begins to twist along the noun object 10 axis 46. This twisting represents voluntary action by the subject, "Rover." First, the object 10 twists a partial revolution in one direction, then it twists in the other direction. This twisting continues, back and forth, as the subject, "Rover," continues to voluntarily act. The noun object 18 represents a singular direct object. With animation, when the sphere shaped object 23, representing the verb, shines light on the noun object 18 (representing a direct object), the noun object 18 moves toward the noun object 10 (representing the subject). The noun object 18 bends to appear as if it is being pulled into the noun object 10, illustrating the concept of acquisition.

As the animated dynamics proceed, the noun object 18, representing a direct object, "chocolate," will move forward and finally merge into the noun object 10 representing the subject, and then disappear. After the noun object 18 merges into the noun object 10, representing the fact that Rover eats the chocolate, the noun object 10 continues to twist. The conjunction "and," represented by the three-dimensional plus 38, then moves towards and merges into the subject and the two direct noun objects 18', 18" (which represent the plural direct object "cookies") follow. These objects 18', 18" also bend, as seen in FIG. 3, to appear as if they are being pulled into the subject 10. Both the three-dimensional plus 38 and the noun objects 18', 18" move toward and merge into the subject 10, representing that the subject 10, "Rover," eats the cookies.

As the animated dynamics proceed, the noun object 18, representing the direct object "chocolate," moves toward and finally merges into the noun object 10 and then disappears. After the noun object 18 merges into the noun object 10, representing that Rover eats chocolate, the noun object 10, representing the subject's action, continues to twist, and the noun object 18', representing another direct object, moves toward and merges into the noun object 10, representing that Rover eats cookies. The conjunction, "and," represented by the three-dimensional plus 38, moves along between the direct objects 18, 18', as seen in FIG. 3, to represent the connection role of the conjunction.

Figure 5:
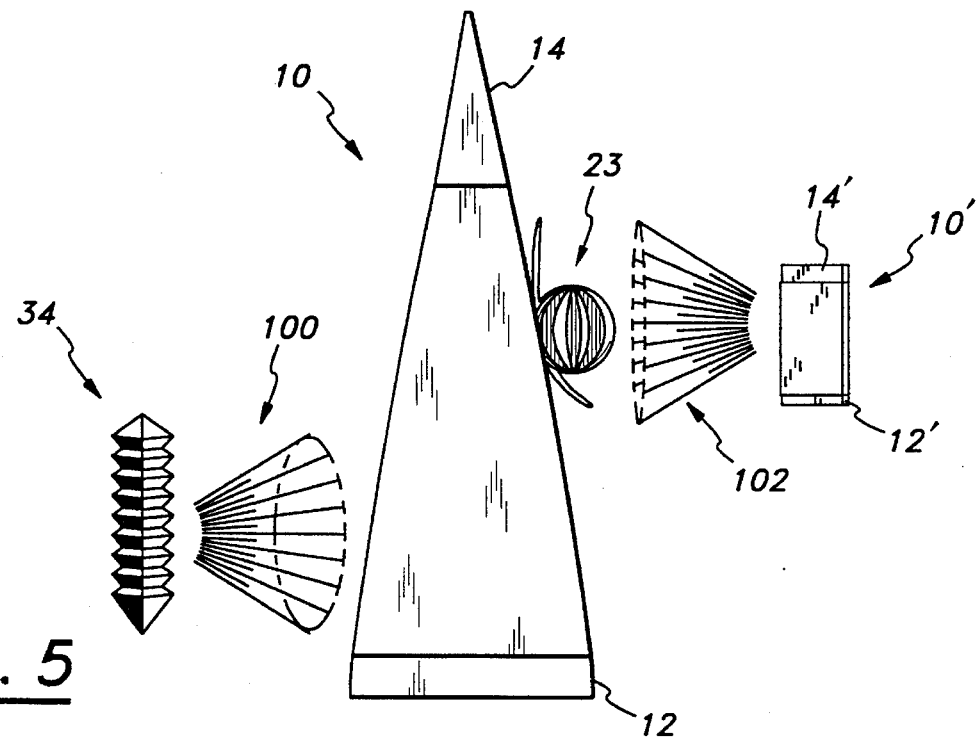
FIG. 5 shows the use of a descriptive adjective object modifying a noun represented by a noun object in a simple sentence according to the present invention.

FIG. 5 depicts the action of an object 34, representing an adjective, upon the corresponding noun object 10, representing a subject in a simple sentence like "the little dog is my friend." The adjective object 34 orbits the noun object 10, and light 100 shines from the adjective object 34 onto the noun object 10, representing the adjective's description of the noun. To form the sentence, "the little dog is my friend," the word "the" is represented by the headpiece 14 of the noun object 10; the adjective object 34 represents "little;" the noun object 10 represents "dog;" the sphere-shaped verb object 23 represents "is;" the headpiece 14 of the noun object 10' represents "my"; and the noun object 10' (functioning as a descriptive predicate noun belonging to the nominative case) represents "friend."

Figure 6:
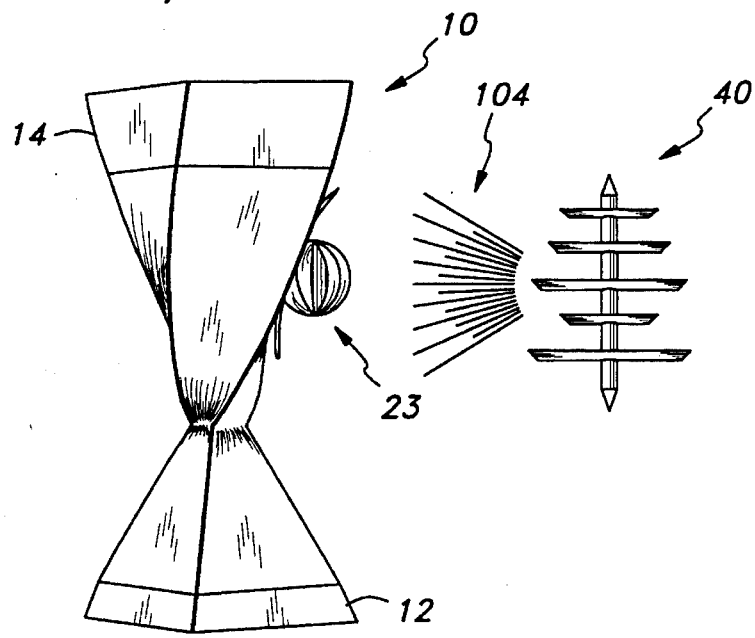
FIG. 6 shows the use of an adverb object in a representation of a simple sentence consistent with the present invention.

FIG. 6 depicts the use of an object 40 representing an adverb, and illustrates the adverb's modification of the verb, represented by the sphere 23. With animation, the adverb object 40 orbits the noun object 10 and verb object 23 which are connected. As the adverb object 40 orbits, it shines light on the sphere shaped verb 23 to represent the adverb's modification of the verb, hence the behavior of the subject in the sentence. A sentence represented in this scenario might be "Rover barks loudly."

The objects depicted in the figures may be implemented in a variety of ways. Similarly, the movement and dynamic interaction can be simulated using animation techniques well known in the art. For instance, in one embodiment, the geometrically-shaped objects can be generated and also animated through computer graphics programming techniques. The dynamic interactions and movements of objects representing predetermined sentences programmed in accordance with the appropriate grammatical rules can be displayed on a computer screen. In another embodiment, the geometrical objects can be generated and animated through a computer, and the animated representations of predetermined sentences for a visual language could be recorded on a video tape for displaying and viewing. This is particularly useful in the educational environment in that many classrooms have a television and a video tape player available for use. By viewing the animated dynamic interaction for a number of sentences, the student begins to comprehend how the appropriate graphical objects that represent the parts of speech in a selected language interact and the grammatical functions or role which each part of speech has in the language.

In another embodiment, predetermined sentences could be animated using conventional animation through a series of still drawings incorporated to create animated motion, as is well known in the art.

In yet another embodiment, the animation could be generated using a computer, and the interaction for predetermined sentences could be pre-programmed. In an interactive environment, the student could select the sentence or clause which he or she desires to be displayed and the computer would display the appropriate animated interaction of the representative objects.

In still another embodiment, the objects could be three-dimensional structures animated with motors or the like. Accordingly, as will be understood, there is no limit to the number of ways the objects can be animated.

The preceding embodiments demonstrate that the colored objects and the animated dynamic interaction of the objects to represent sentences or clauses inform the user or viewer about the significance of the various parts of speech in a sentence, and help the user to quickly understand proper use of the given language.

Consistent with the present invention, the animated dynamic movements and interactions between the categories and colors of different objects, can represent any word, sentence, or expression in most any natural language.

The embodiments described here are only exemplary of simple usage of the invention to realize simple expressions and sentences. Many other embodiments, representations, and animated dynamic interactions within and between the objects are intended which include other features and embodiments of the invention.

For instance, the system described above provides a training system for environments other than language. The system is amenable to any environment with interrelated parts. For instance, one additional embodiment is for modeling a system for pharmacology and toxicology to demonstrate and compare the effects of pharmaceutical drugs and toxicants in man and animals. In language, a verb entering a noun is a process which changes a simple noun to a subject. Likewise, in toxicology, a toxicant entering into a union with a healthy organism changes the organism into an exposed organism, also a process.

A system according to the present invention for toxicology employs colored, geometrically-shaped objects to represent dynamic processes, simultaneous alterations of drugs or toxicant and the exposed organism. Beneficial alterations induced by measures to alleviate over exposure may also be depicted. The animated objects could interact to demonstrate the dynamic processes involved in drug or toxicant fate and illustrate the pharmacologic or toxicologic mechanisms which account for the clinically relevant biochemical, physiologic, or pathologic effects.

Figure 7:
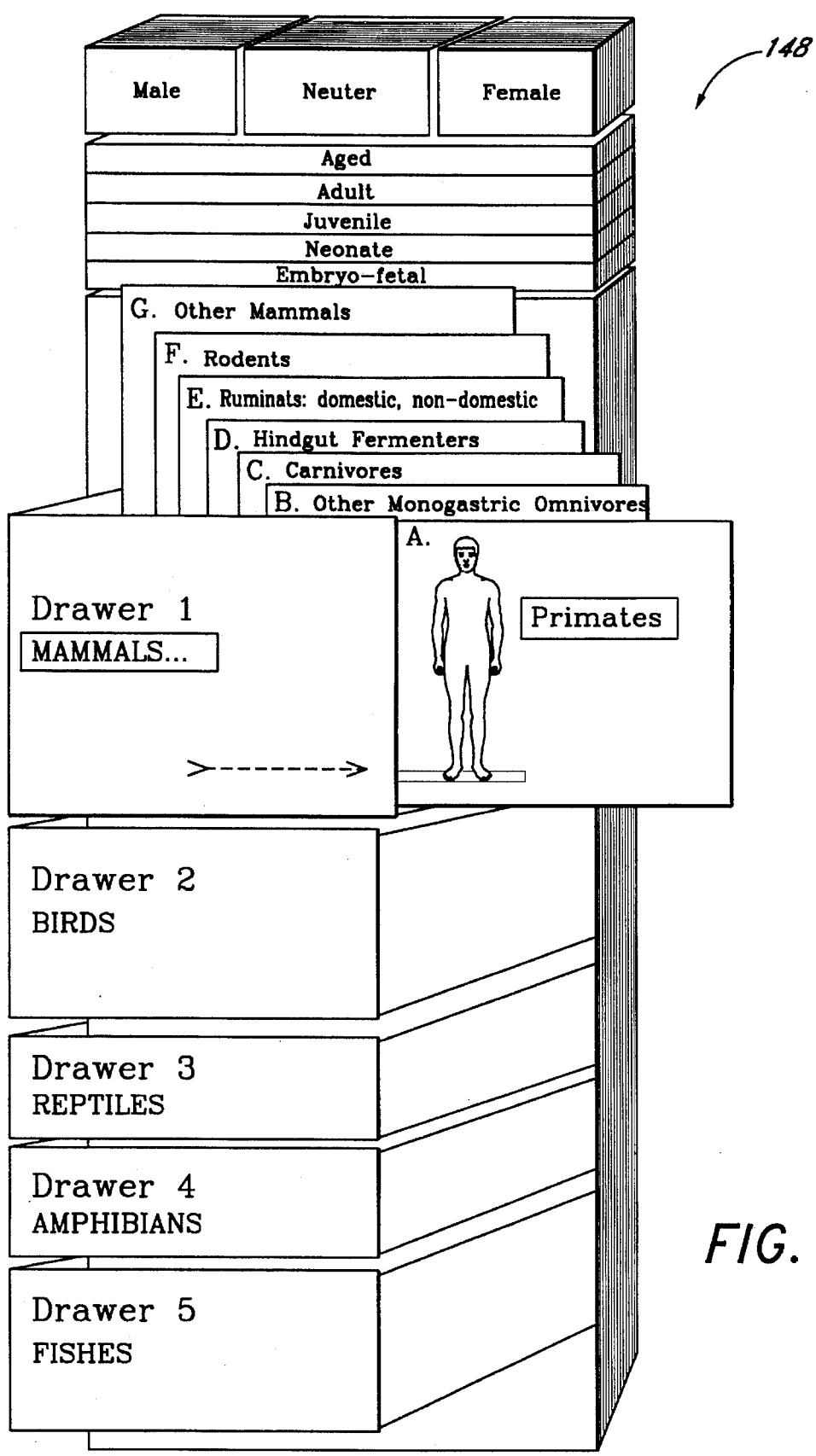
FIG. 7 depicts an object which could represent organisms exposed to drugs or toxicants.

FIG. 7 depicts an object 148 which could represent organisms exposed to drugs or toxicants. Each drawer represents a group of vertebrate animals sharing common attributes. Within the various classes of vertebrate organisms (i.e., inside the drawers) are Species or Broad Species Groups. The hierarchical system provides access to date on an exposed organism as well as other vertebrate species.

Figure 8:
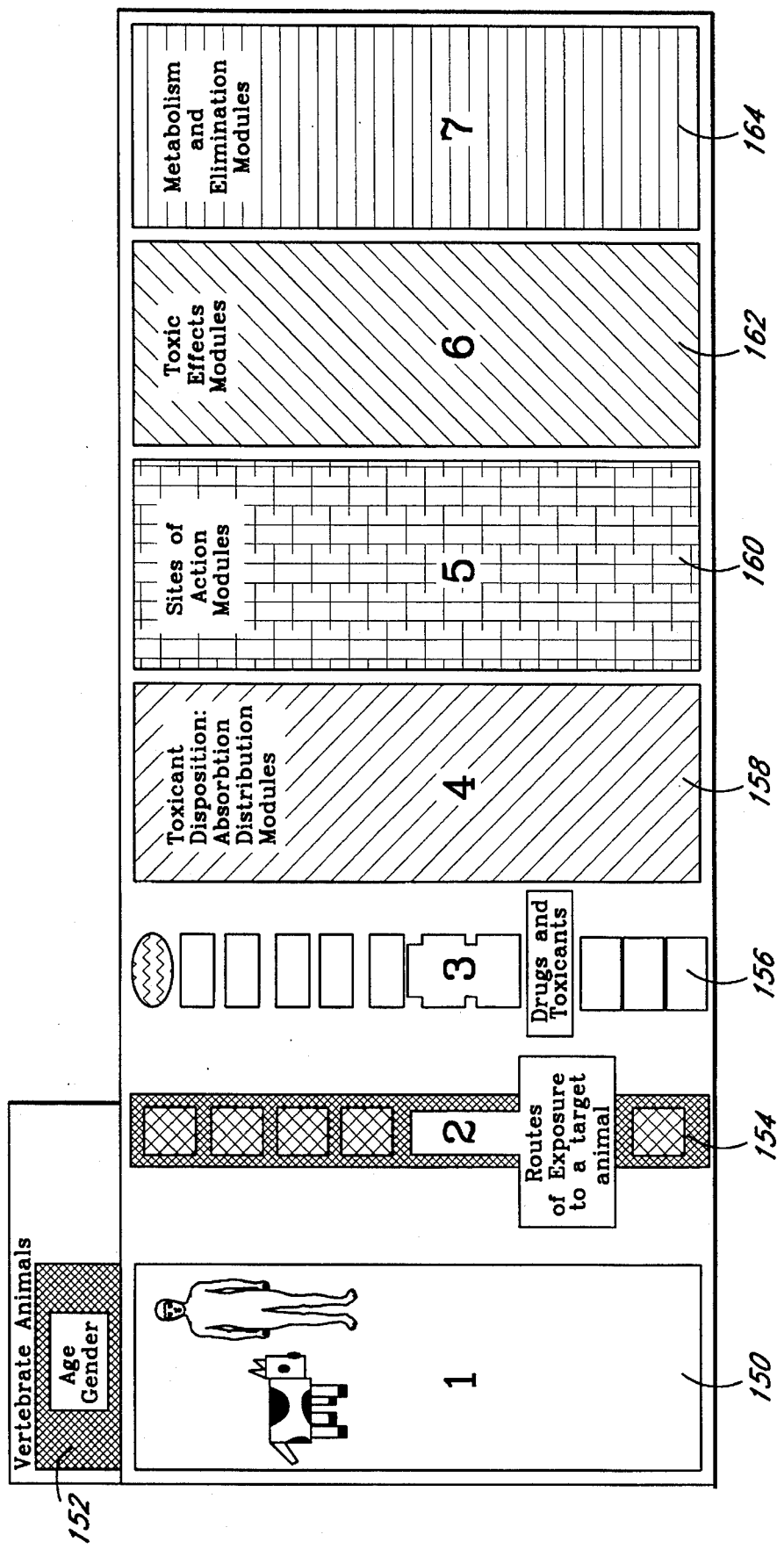
FIG. 8 depicts a framework of organization for a toxicology model according to the present invention.

A framework of organization for objects similar in shape to some of those explained in reference to use of the present invention in a language training system are depicted in FIG. 8 for a toxicology model. The framework has a position 150 for objects representing organisms exposed to drugs or toxicants, a position 152 for objects representing age or gender, a position 154 for objects representing routes of exposure to a target animal, a position 156 for objects representing toxicants, a position 158 for objects representing toxicant disposition: absorption and distribution, a position 160 for objects representing sites of action, a position 162 for objects representing toxic effects, and a position 164 for objects representing metabolism and elimination. Through the use of interrelationships and interaction involving changes in space, shape, and color over time, the access of a compound to a target site and its actions at the biochemical level, and at succeedingly higher levels (cell, tissue, organ, system and organism) are depicted.

Although a preferred embodiment of the present invention has been described and illustrated above, those skilled in the art will appreciate the various changes and modifications that can be made to the present invention without departing from its spirit. Accordingly, the scope of the present invention is deemed to be limited only by the scope of the following appended claims.

What is claimed is:

1. An educational method for teaching the functions, interrelationships and interaction between the parts of a natural human language, comprising the steps of:

providing a plurality of objects of differing and unique geometrical shapes, each part of speech of said natural human language being represented by an object of a different unique geometrical shape;

selecting a clause with a plurality of words;

assigning appropriate ones of said objects to represent each of said plurality of words, the shape of each one of said appropriate ones of said objects corresponding to the part of speech of the word represented;

displaying said appropriate ones of said objects in combination with the represented words;

arranging said appropriate ones of said objects in accordance with a predetermined grammatical pattern based on grammatical rules of said natural human language to form the clause; and causing said appropriate ones of said objects to undergo animated shape changes and animated interaction between the appropriate ones of said objects, said animated shape changes and animated interactions representing symbolically the actions performed on or by, and the interactions between, the plurality of words in the clause.

2. The method of claim 1, wherein said parts of speech comprise nouns, verbs, adjectives, adverbs, interjections, conjunctions, pronouns and prepositions, or similarly corresponding parts of speech in said natural human language.

3. The method of claim 2, wherein the objects representing said nouns comprise an integral base representing only pronouns, an integral headpiece representing appropriate limiting adjectives, and an integral optional protruding extension representing prepositions.

4. The method of claim 1, wherein each of said parts of speech has subcategories represented by objects of differing colors, each of said colors representing a subcategory within each of said parts of speech.

5. The method of claim 1, wherein said animated shape changes and said animated dynamic interaction within and between said objects is particularly defined to represent the part of speech and its action or role in said natural human language.

6. An educational method of teaching a natural human language, comprising the steps of:

providing a plurality of images, each image having a differing and unique geometrical shape, and each different part of speech of said natural human language being represented by a uniquely shaped image;

selecting a phrase with at least one word;

assigning an appropriate one of said images to represent said at least one word;

displaying said appropriate one of said images;

arranging said appropriate one of said images in accordance with a predetermined grammatical pattern based on the grammatical rules of said natural human language to form the phrase; and animating said appropriate one of said images to cause said appropriate one of said images to undergo shape changes that represent the grammatical function or role and the associated actions of the at least one word in the phrase.

7. The method of claim 6, further comprising the step of causing at least one of said images to shine light on at least one other of said images.

8. The method of claim 6, wherein each image has a corresponding color to represent subcategories within each of said parts of speech.

9. The method of claim 6, wherein said parts of speech comprise nouns, verbs, adjectives, adverbs, interjections, conjunctions, pronouns and prepositions, or similarly corresponding parts of speech in said natural human language.

10. The method of claim 9, wherein a selected image of the shape representing said nouns comprises an integral base representing only pronouns, an integral headpiece representing appropriate limiting adjectives (determiners), and an integral optional protruding extension member representing prepositions.

11. An educational method for teaching the functions, the interrelationships, and the actions and interaction between the parts of a natural human language, comprising the steps of:

displaying a plurality of geometrically-shaped objects, each part of speech of said natural human language being represented by an object of a different unique geometrical shape;

selecting a sentence comprising a plurality of words;

assigning appropriate ones of said objects to represent each of said plurality of words, the shape of each one of the appropriate ones of the objects corresponding to the part of speech of the word represented;

displaying the appropriate ones of the objects in combination with the words represented;

arranging said appropriate ones of said objects in accordance with a predetermined grammatical pattern of said natural human language to form the sentence; and animating said appropriate ones of said objects to undergo shape changes and interaction between the objects to represent symbolically the actions performed on or by each part of speech of the plurality of words and the interaction between said each part of speech of the plurality of words in forming the sentence.

12. The method of claim 11, wherein said parts of speech comprise nouns, verbs, adjectives, adverbs, interjections, conjunctions, pronouns and prepositions, or similarly corresponding parts of speech in said natural human language.

13. The method of claim 12, wherein the objects representing said nouns comprise an integral base representing only pronouns, an integral headpiece representing appropriate limiting adjectives (determiners), and an integral optional protruding extension representing prepositions.

14. The method of claim 11, wherein each of said parts of speech has subcategories represented by objects of differing colors, each of said colors representing a subcategory within each of said parts of speech.

15. The method of claim 11, wherein said predetermined grammatical pattern is derived from the grammatical rules of said natural human language.

16. A method of modeling a process with an animated system, said method comprising the steps of:

providing a plurality of objects of differing and unique shapes;

providing a plurality of interrelated elements, each interrelated element represented by an object of a different unique shape;

selecting at least two of said interrelated elements in said process;

assigning two appropriate objects from said plurality of objects to represent said at least two elements;

displaying said two appropriate objects in combination with said at least two elements;

arranging said two appropriate objects in accordance with a framework defined by the logical flow of the process; and causing said two appropriate objects to undergo animated shape changes and animated interaction between the objects that represent symbolically the actions performed on or by the components during the process.

17. The method of claim 16, wherein said process is modeling toxicology.

18. The method of claim 16, wherein said process is modeling pharmacology.

* * * * *